United States Patent
Peterson et al.

(10) Patent No.: US 8,225,405 B1
(45) Date of Patent: Jul. 17, 2012

(54) HEURISTIC DETECTION MALICIOUS CODE BLACKLIST UPDATING AND PROTECTION SYSTEM AND METHOD

(75) Inventors: Christopher Peterson, Culver City, CA (US); Joseph H. Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 790 days.

(21) Appl. No.: 12/362,352

(22) Filed: Jan. 29, 2009

(51) Int. Cl.
*H04L 29/06* (2006.01)

(52) U.S. Cl. ............. 726/24; 726/23; 726/25; 713/187; 713/188

(58) Field of Classification Search .............. 726/24
See application file for complete search history.

(56) References Cited

U.S. PATENT DOCUMENTS

| | | | |
|---|---|---|---|
| 5,440,723 A * | 8/1995 | Arnold et al. | 714/2 |
| 6,622,150 B1 * | 9/2003 | Kouznetsov et al. | 1/1 |
| 7,228,565 B2 * | 6/2007 | Wolff et al. | 726/24 |

OTHER PUBLICATIONS

"Kaspersky Lab Advances Internet Security with New 'Triple Threat' Protection Products", 7.0 Press Release, Aug. 1, 2007, pp. 1-3 [online]. Retrieved on Dec. 5, 2008 from the Internet: <URL:http://usa.kaspersky-labs.com/about-us/press_release7.php>. No author provided.

\* cited by examiner

*Primary Examiner* — Longbit Chai
(74) *Attorney, Agent, or Firm* — McKay and Hodgson, LLP; Serge J. Hodgson; Sean P. Lewis

(57) ABSTRACT

Unknown malicious code is heuristically detected on a host computer system. A virus signature for the malicious code is created locally on the host computer system. A blacklist on the host computer system is updated with the virus signature for the heuristically detected malicious code. Accordingly, the blacklist is updated with the virus signature of the heuristically detected malicious code without distribution of the virus signature to the general public. Further, the host computer system is scanned for other instances of the heuristically detected malicious code using the created virus signature. Accordingly, file based detection and remediation of the malicious code is achieved without requiring execution of the malicious code for detection and the associated risks.

19 Claims, 3 Drawing Sheets

HEURISTIC DETECTION MALICIOUS CODE BLACKLIST UPDATING AND PROTECTION SYSTEM AND METHOD

BACKGROUND

1. Field of the Invention

The present invention relates to computer system security. More particularly, the present invention relates to a system and method of protecting computer systems from malicious code.

2. Description of the Related Art

To protect computer systems from malicious code, an anti-virus scanner is used. The anti-virus scanner typically scans the computer system for malicious code using virus definitions of malicious code.

The anti-virus scanner relies upon updates from security vendor update sites. These updates are an important component of the anti-virus scanner. For example, as new malicious code is discovered, new virus definitions are distributed as an update to enable the anti-virus scanner to detect the newly discovered malicious code.

Unfortunately, it is often not practical to distribute new virus definitions to the entire public in the case where new malicious code is discovered only on a few computer systems, e.g., on one or two computer systems. In this event, the infected computer systems are not protected by the antivirus scanner.

However, the malicious code can still be detected on the infected computer system heuristically using a malicious code heuristic detection application. For example, abnormal behavior of an application can be detected by the malicious code heuristic detection application to determine that the application is in fact malicious code. Based on this heuristic detection, the detected malicious code is remediated.

Although the heuristically detected malicious code is remediated, other instances of the malicious code may remain on the computer system. Upon execution, these other malicious code instances should be heuristically detected. However, the other malicious code instances still have the potential to damage the computer system.

SUMMARY OF THE INVENTION

In accordance with one embodiment, unknown malicious code is heuristically detected on a host computer system. A virus signature for the heuristically detected malicious code is created locally on the host computer system. A blacklist on the host computer system is updated with the virus signature for the heuristically detected malicious code. Accordingly, the blacklist is updated with the virus signature of the heuristically detected malicious code without distribution of the virus signature to the general public.

Further, the host computer system is scanned for other instances of the heuristically detected malicious code using the created virus signature. If any other instances of the malicious code are detected, the malicious code is remediated. Accordingly, file based detection and remediation of the malicious code is achieved without requiring execution of the malicious code for detection and the associated risks.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
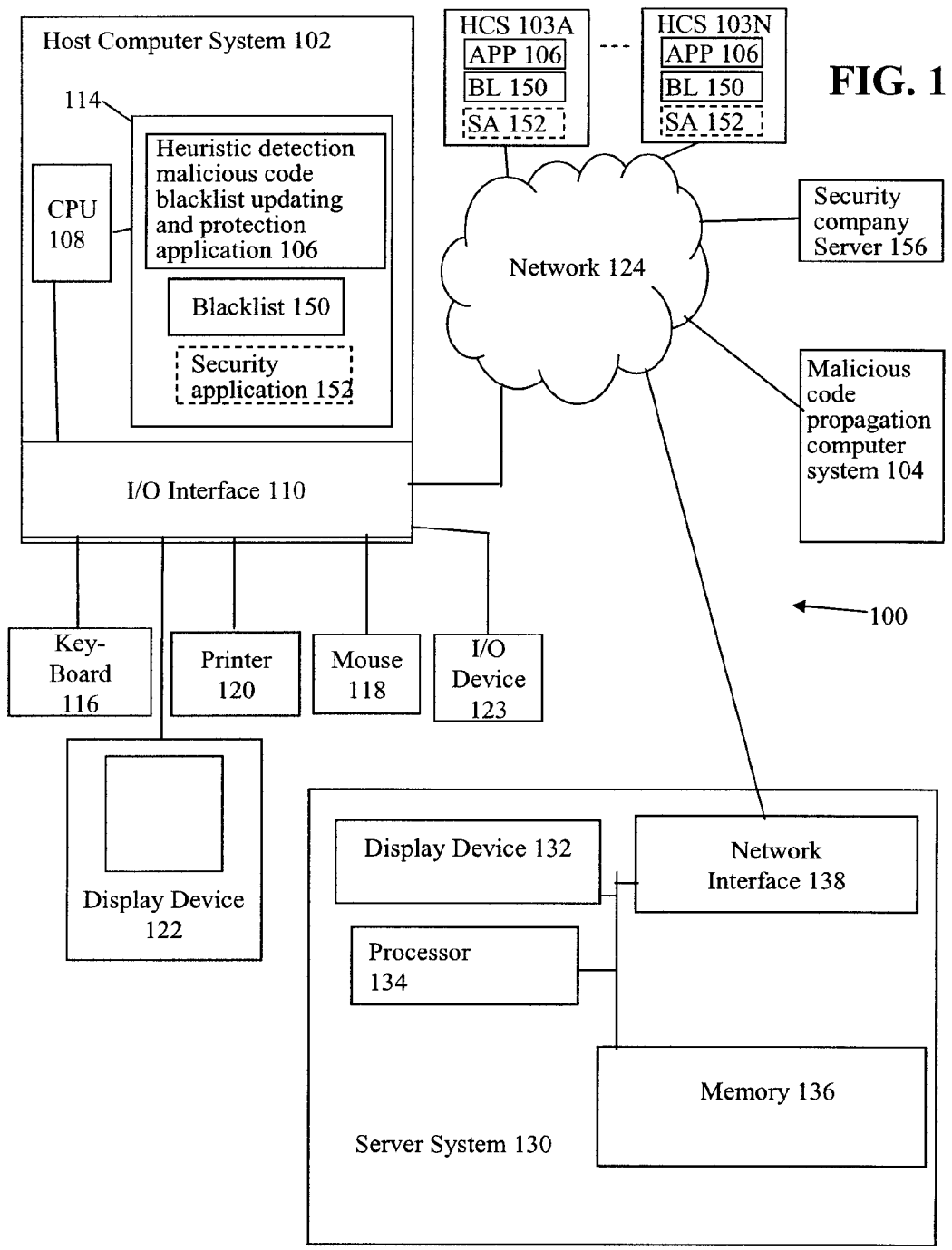
FIG. 1 is a diagram of a client-server system that includes a heuristic detection malicious code blacklist updating and protection application executing on a host computer system in accordance with one embodiment.
Figure 2:
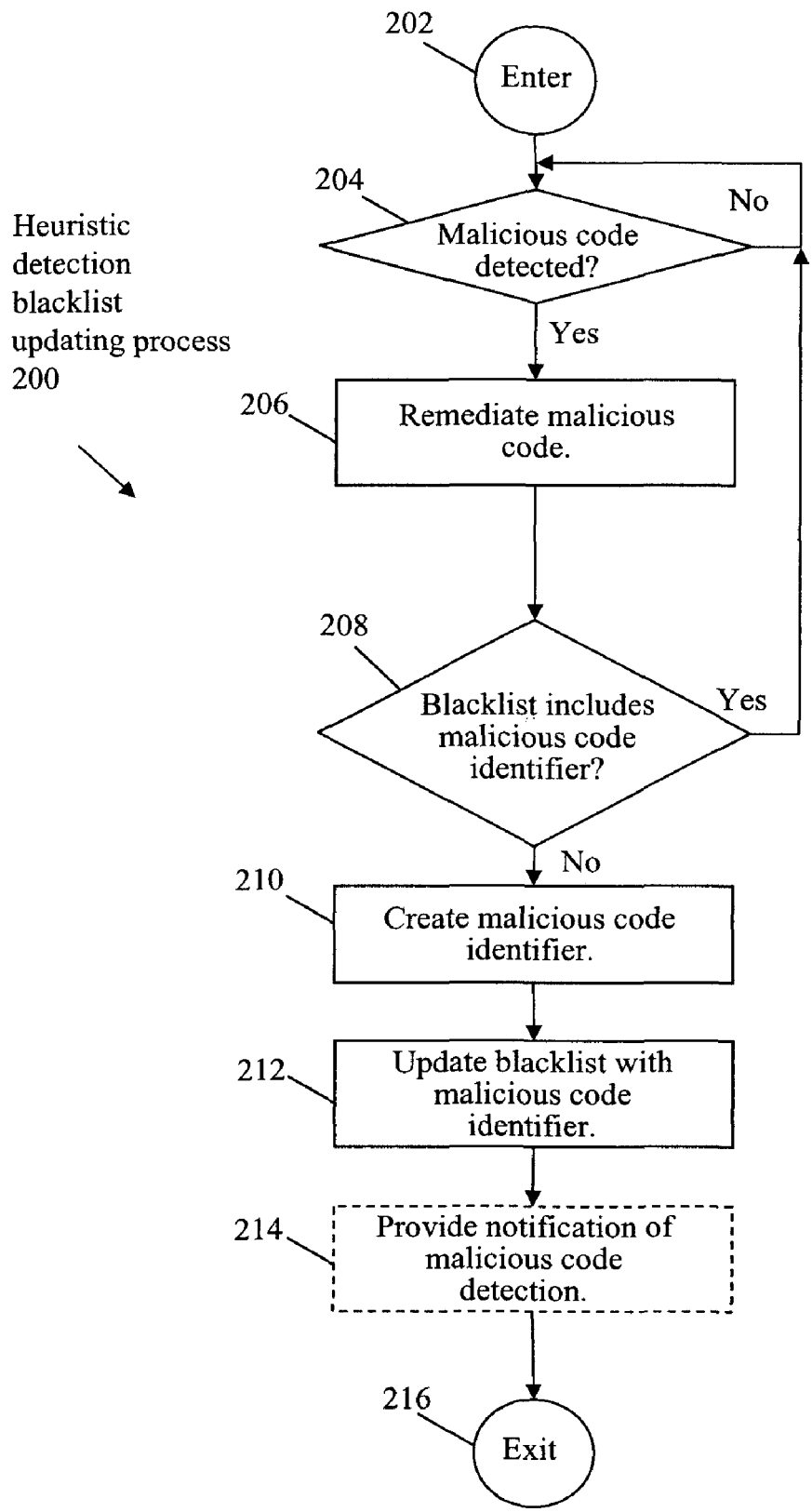
FIG. 2 is a flow diagram of a heuristic detection blacklist updating process in accordance with one embodiment.

As an overview, in accordance with one embodiment, referring to FIGS. 1 and 2, unknown malicious code is heuristically detected on host computer system 102 in a MALICIOUS CODE DETECTED CHECK OPERATION 204. A virus signature for the heuristically detected malicious code is created locally on host computer system 102 in a CREATE MALICIOUS CODE IDENTIFIER OPERATION 210. A blacklist 150 on host computer system 102 is updated with the virus signature for the heuristically detected malicious code in an UPDATE BLACKLIST WITH MALICIOUS CODE IDENTIFIER OPERATION 212. Accordingly, blacklist 150 of host computer system 102 is updated with the virus signature of the heuristically detected malicious code without distribution of the virus signature to the general public.

Figure 3:
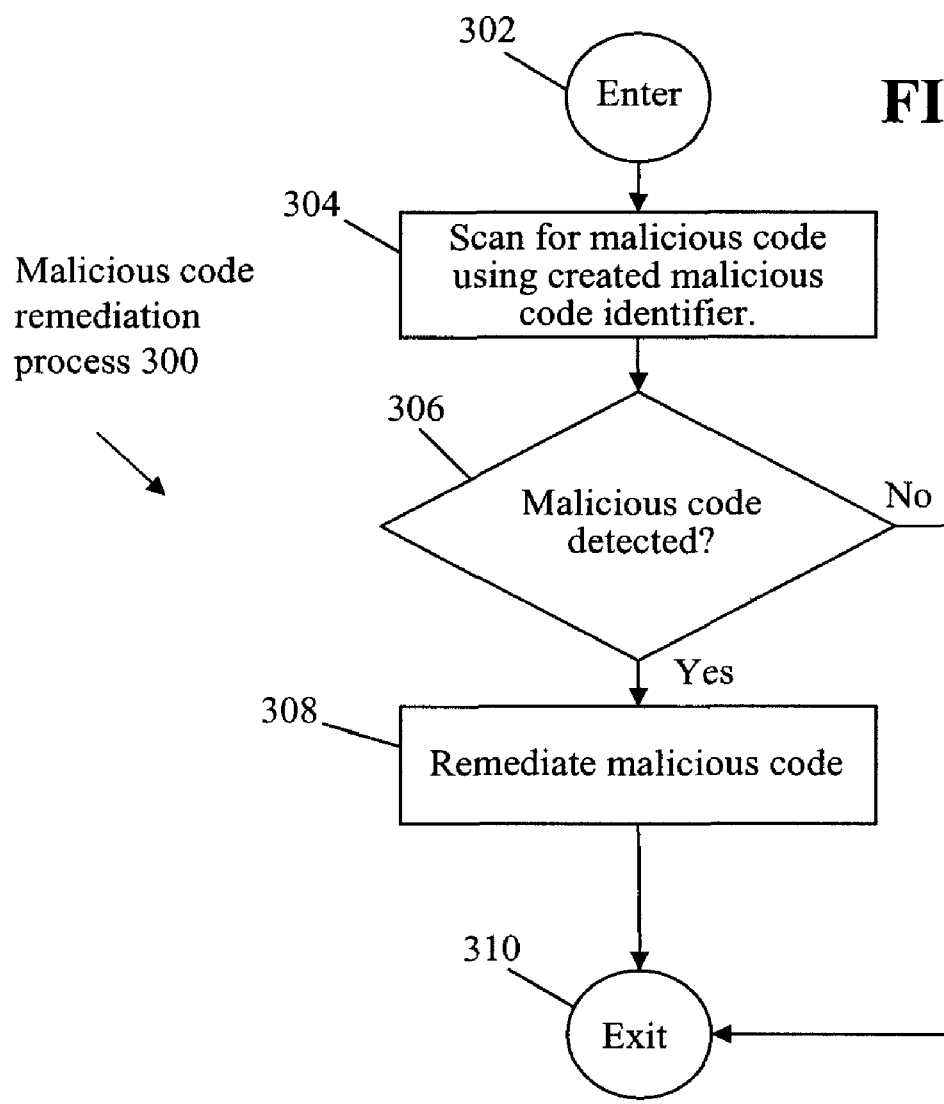
FIG. 3 is a flow diagram of a malicious code remediation process in accordance with one embodiment.

Further, referring now to FIGS. 1 and 3 together, host computer system 102 is scanned for other instances of the heuristically detected malicious code using the created virus signature in SCAN FOR MALICIOUS CODE USING CREATED MALICIOUS CODE IDENTIFIER OPERATION 304. If any other instances of the malicious code are detected in MALICIOUS CODE DETECTED CHECK OPERATION 306, the malicious code is remediated in REMEDIATE MALICIOUS CODE OPERATION 308. Accordingly, file based detection and remediation of the malicious code is achieved without requiring execution of the malicious code for detection and the associated risks.

Now in more detail, FIG. 1 is a diagram of a client-server system 100 that includes a heuristic detection malicious code blacklist updating and protection application 106 executing on a host computer system 102, e.g., a first computer system, in accordance with one embodiment.

Host computer system 102, sometimes called a client or user device, typically includes a central processing unit (CPU) 108, hereinafter processor 108, an input output (I/O) interface 110, and a memory 114.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, heuristic detection malicious code blacklist updating and protection application 106 is loaded into host computer system 102 via I/O device 123, such as from a CD, DVD or floppy disk containing heuristic detection malicious code blacklist updating and protection application 106.

Host computer system 102 is coupled to a server system 130 of client-server system 100 by network 124. Server system 130 typically includes a display device 132, a processor 134, a memory 136, and a network interface 138.

Further, host computer system 102 is also coupled to a malicious code propagation computer system 104 and a security company server 156 by network 124.

Also connected to network 124 are a plurality of host computer systems (HCS) 103A, . . . , 103N, collectively host computer systems 103. Host computer systems 103 are similar to host computer system 102 and each include a heuristic detection malicious code blacklist updating and protection application 106 (APP 106), a blacklist 150 (BL 150), and optionally a security application 152 (SA 152) as discussed further below. In one embodiment, host computer systems 103 represent the public at large that receive virus definition updates from security company server 156, sometimes called customers of the security company associated with security company server 156.

In one embodiment, malicious code propagation computer system 104, security company server 156, and host computer systems 103 are similar to host computer system 102 and/or server system 130, for example, include a central processing unit, an input output (I/O) interface, and a memory.

Malicious code propagation computer system 104, security company server 156, and host computer systems 103 may further include standard devices like a keyboard, a mouse, a printer, a display device and an I/O device(s). The various hardware components of malicious code propagation computer system 104, security company server 156, and host computer systems 103 are not illustrated to avoid detracting from the principles of this embodiment.

Network 124 can be any network or network system that is of interest to a user. In various embodiments, network interface 138 and I/O interface 110 include analog modems, digital modems, or a network interface card.

Host computer system 102 includes a blacklist 150 stored in memory 114. Blacklist 150 is a collection of malicious code identifiers that identify several different malicious codes. In one embodiment, malicious code is defined as any computer program, module, set of modules, or code that enters a computer system without an authorized user's knowledge and/or without an authorized user's consent.

In one embodiment, a malicious code identifier is or includes a virus signature, sometimes called a malicious code signature, which is used to find malicious code patterns inside of files by scanning the files for the virus signature. In one specific example, a virus signature is a characteristic byte-pattern that is part of certain malicious code. Typically, several virus signatures are stored as a virus definition file, sometimes called virus definitions.

In one embodiment, blacklist 150 is a virus definition file. In another embodiment, in addition to a virus definition file, blacklist 150 includes other identifiers of malicious code. These identifiers include, for example, the website from which the malicious code is downloaded, the file name of the malicious code, or other identifiers of the malicious code.

Further, host computer system 102 includes, optionally, security application 152 stored in memory 114. Security application 152 identifies malicious code on host computer system 102. In one embodiment, security application 152 includes an antivirus scanner that scans for malicious code using blacklist 150. In another embodiment, security application 152 includes a malicious code heuristic detection application that heuristically identifies malicious code, e.g., based upon the behavior of the malicious code.

Although security application 152 as a separate component is set forth, in another embodiment, heuristic detection malicious code blacklist updating and protection application 106 performs one or more of the functions of security application 152, e.g., includes an antivirus scanner and/or a malicious code heuristic detection application. Accordingly, security application 152 is an optional component in accordance with this embodiment.

FIG. 2 is a flow diagram of a heuristic detection blacklist updating process 200 in accordance with one embodiment.

Referring now to FIGS. 1 and 2 together, execution of heuristic detection malicious code blacklist updating and protection application 106 by processor 108 results in the operations of heuristic detection blacklist updating process 200 as described below in one embodiment.

From an ENTER OPERATION 202, flow moves to a MALICIOUS CODE DETECTED CHECK OPERATION 204. In MALICIOUS CODE DETECTED CHECK OPERATION 204, a determination is made as to whether malicious code has been detected on host computer system 102.

If malicious code has not been detected, flow remains at MALICIOUS CODE DETECTED CHECK OPERATION 204. Conversely, if malicious code has been detected, flow moves from MALICIOUS CODE DETECTED CHECK OPERATION 204 to a REMEDIATE MALICIOUS CODE OPERATION 206.

In REMEDIATE MALICIOUS CODE OPERATION 206, the malicious code detected in MALICIOUS CODE DETECTED CHECK OPERATION 204 is remediated. Illustratively, the malicious code is terminated, deleted, quarantined, cleaned, and/or otherwise remediated. In light of this disclosure, those of skill in the art will understand that malicious code is remediated using any one of a number of techniques, and the particular technique used is not essential to this embodiment.

From REMEDIATE MALICIOUS CODE OPERATION 206, flow moves to a BLACKLIST INCLUDES MALICIOUS CODE IDENTIFIER CHECK OPERATION 208. In BLACKLIST INCLUDES MALICIOUS CODE IDENTIFIER CHECK OPERATION 208, a determination is made as to whether blacklist 150 includes a malicious code identifier for the malicious code detected in MALICIOUS CODE DETECTED CHECK OPERATION 204.

If blacklist 150 does include a malicious code identifier for the malicious code detected in MALICIOUS CODE DETECTED CHECK OPERATION 204, flow returns to MALICIOUS CODE DETECTED CHECK OPERATION 204 and awaits the next malicious code detection.

Conversely, if blacklist 150 does not include a malicious code identifier for the malicious code detected in MALICIOUS CODE DETECTED CHECK OPERATION 204, flow moves to a CREATE MALICIOUS CODE IDENTIFIER OPERATION 210.

To illustrate, in one embodiment, an antivirus scanner of heuristic detection malicious code blacklist updating and protection application 106, and/or optionally, of security application 152, scans host computer system 102, e.g., files thereof, using virus definitions of blacklist 150. This scan can be triggered manually by the user, e.g., human, of host computer system 102, on access of a file or resource of host computer system 102, or by a scheduled scan of host computer system 102.

During this scan, a determination is made that a file matches a virus signature of the virus definitions of blacklist 150. For example, a byte-pattern of the file, e.g., the hash value of the file, matches the byte-pattern of the virus signature, e.g., a hash value, indicating that the file includes malicious code. Accordingly, a determination is made that malicious code is detected in MALICIOUS CODE DETECTED CHECK OPERATION 204, and flow moves to BLACKLIST INCLUDES MALICIOUS CODE IDENTIFIER CHECK OPERATION 208 after the malicious code is remediated in REMEDIATE MALICIOUS CODE OPERATION 206.

In BLACKLIST INCLUDES MALICIOUS CODE IDENTIFIER CHECK OPERATION 208, a determination is made that blacklist 150 does include a malicious code identifier for the malicious code detected in MALICIOUS CODE DETECTED CHECK OPERATION 204. More particularly, in accordance with this example, blacklist 150 includes the virus signature, i.e., a malicious code identifier, of the malicious code. Accordingly, the malicious code is known malicious code for which a malicious code identifier already exists in blacklist 150. Accordingly, host computer system 102 is already protected from the known malicious code. Thus, flow returns to MALICIOUS CODE DETECTED CHECK OPERATION 204 and awaits the next malicious code detection.

To further illustrate, in another embodiment, a malicious code heuristic detection application of heuristic detection malicious code blacklist updating and protection application 106, and/or optionally, of security application 152, heuristically identifies malicious code, e.g., based upon the behavior of the malicious code.

A heuristic identification of malicious code can have various degrees of certainty that the suspected malicious code is in fact malicious code. In one embodiment, the probability that the suspected malicious code is in fact malicious code must exceed a threshold probability for a determination to be made in MALICIOUS CODE DETECTED CHECK OPERATION 204 that a malicious code detection has in fact occurred. In this manner, remediation of legitimate code that behaves in a suspicious manner is avoided.

In light of this disclosure, those of skill in the art will understand that malicious code is heuristically identified using any one of a number of techniques, and the particular technique used is not essential to this embodiment.

Upon a determination that malicious code is detected in MALICIOUS CODE DETECTED CHECK OPERATION 204, flow moves to BLACKLIST INCLUDES MALICIOUS CODE IDENTIFIER CHECK OPERATION 208 after the malicious code is remediated in REMEDIATE MALICIOUS CODE OPERATION 206. In BLACKLIST INCLUDES MALICIOUS CODE IDENTIFIER CHECK OPERATION 208, the heuristically detected malicious code is compared to the malicious code identifiers of blacklist 150 to determine whether the malicious code identifier for the heuristically detected malicious code exists within blacklist 150. For example, an antivirus scanner of heuristic detection malicious code blacklist updating and protection application 106, and/or optionally, of security application 152, scans the heuristically detected malicious code using virus definitions of blacklist 150.

If the heuristically detected malicious code matches a virus signature in the virus definitions of blacklist 150, then blacklist 150 includes a malicious code identifier, e.g., the virus signature, of the heuristically detected malicious code. In accordance with this example, the heuristically detected malicious code is known malicious code, e.g., is malicious code for which a virus signature does exist in blacklist 150. Thus, flow returns to MALICIOUS CODE DETECTED CHECK OPERATION 204 and awaits the next malicious code detection as set forth above.

Conversely, if the heuristically detected malicious code does not match any virus signature in the virus definitions of blacklist 150, then blacklist 150 does not include a malicious code identifier, e.g., the virus signature, of the heuristically detected malicious code.

More particularly, the heuristically detected malicious code is unknown malicious code. In accordance with one embodiment, unknown malicious code is malicious code for which a virus signature does not exist in blacklist 150, e.g., the virus signature for the malicious code has not been created. Typically, malicious code must be captured and then analyzed to create the virus signature for the malicious code.

Once a virus signature is created for the malicious code and blacklist 150 is updated with the virus signature, the malicious code is no longer unknown malicious code, but is known malicious code.

More particularly, in accordance with this example, blacklist 150 does not include the virus signature, i.e., a malicious code identifier, of the malicious code. Accordingly, the malicious code is unknown malicious code for which a malicious code identifier does not exist in blacklist 150. Accordingly, host computer system 102 is vulnerable to the unknown malicious code. Thus, flow moves to CREATE MALICIOUS CODE IDENTIFIER OPERATION 210.

In CREATE MALICIOUS CODE IDENTIFIER OPERATION 210, a malicious code identifier for the unknown malicious code detected in MALICIOUS CODE DETECTED CHECK OPERATION 204 is created. In one embodiment, a virus signature for the heuristically detected malicious code is created. For example, a hash value of the malicious code is created using a cryptographic hash function. The resulting hash value is the malicious code identifier, also called the virus signature, for the unknown malicious code. A cryptographic hash function is a deterministic procedure that takes the malicious code, or a portion thereof, and returns a fixed-size bit string called the hash value. One example of a cryptographic hash function is an MD5 (Message-Digest algorithm 5) hash function.

In another embodiment, a portion, sometimes called snippet, of the unknown malicious code that uniquely identifies the unknown malicious code is extracted. This portion is the unknown malicious code identifier, sometimes called the virus signature.

Although examples of creating a malicious code identifier that uniquely identifies the heuristically detected malicious code are set forth above, in light of this disclosure, those of skill in the art will understand that a malicious code identifier for the heuristically detected malicious code can be created using any one of the number of techniques, and the particular technique used is not essential to this embodiment.

In one embodiment, heuristic detection malicious code blacklist updating and protection application 106 creates the malicious code identifier locally on host computer system 102. In accordance with this embodiment, the malicious code identifier is created without interaction of host computer system 102 externally of host computer system 102.

In another embodiment, the heuristically detected malicious code, or a sample thereof, is provided from host computer system 102 to security company server 156. A malicious code identifier for the heuristically detected malicious code is created by security technicians through response analysis or other technique. The malicious code identifier is returned to host computer system 102 from security company server 156.

In accordance with this embodiment, the malicious code identifier is provided to host computer system 102 and is not provided to host computer systems 103. More particularly, the malicious code identifier is not distributed to the public at large, e.g., through virus definition updates. For example, host computer system 102 receives the malicious code identifier and a separate virus definition update from security company server 156. The virus definition update is distributed to the public at large, e.g., to host computer system 102 and host computer systems 103. The virus definition update does not include a malicious code identifier, e.g., a virus signature, of the malicious code heuristically detected on host computer system 102.

In one embodiment, in the event of an outbreak of the malicious code, as the malicious code infects and is heuristically detected on many of host computer systems 103, many submissions of the heuristically detected malicious code are provided from host computer systems 103 to security company server 156. Depending upon the severity of the outbreak, e.g., once the number of submissions of the malicious code received by security company server 156 reaches a certain threshold number, a virus definition update, e.g., certified virus definitions, including the malicious code identifier of the malicious code is distributed to the public at large, e.g., to host computer system 102 and host computer systems 103.

From CREATE MALICIOUS CODE IDENTIFIER OPERATION 210, flow moves to UPDATE BLACKLIST WITH MALICIOUS CODE IDENTIFIER OPERATION 212. In UPDATE BLACKLIST WITH MALICIOUS CODE IDENTIFIER OPERATION 212, blacklist 150 is updated with the malicious code identifier created in CREATE MALICIOUS CODE IDENTIFIER OPERATION 210. In one embodiment, an entry including the malicious code identifier is added to blacklist 150. In one particular embodiment, blacklist 150 is a virus definition file that is updated with the virus signature of the heuristically detected malicious code.

From UPDATE BLACKLIST WITH MALICIOUS CODE IDENTIFIER OPERATION 212, flow moves, optionally, to a PROVIDE NOTIFICATION OF MALICIOUS CODE DETECTION OPERATION 214. In PROVIDE NOTIFICATION OF MALICIOUS CODE DETECTION OPERATION 214, a notification is provided that unknown malicious code has been detected on host computer system 102. The notification is provided to the user of host computer system, a system administrator, to security company server 156, is logged, and/or is otherwise recorded. In one embodiment, the malicious code identifier created in CREATE MALICIOUS CODE IDENTIFIER OPERATION 210 is provided as part of the notification. From PROVIDE NOTIFICATION OF MALICIOUS CODE DETECTION OPERATION 214, flow moves to and exits at an EXIT OPERATION 216 or returns to MALICIOUS CODE DETECTED CHECK OPERATION 204 and awaits the next malicious code detection.

PROVIDE NOTIFICATION OF MALICIOUS CODE DETECTION OPERATION 214, is optional, and one embodiment, is not perform. In accordance with this embodiment, flow moves directly from UPDATE BLACKLIST WITH MALICIOUS CODE IDENTIFIER OPERATION 212 and exits at EXIT OPERATION 216 or returns to MALICIOUS CODE DETECTED CHECK OPERATION 204 and awaits the next malicious code detection.

As set forth above, after performance of UPDATE BLACKLIST WITH MALICIOUS CODE IDENTIFIER OPERATION 212, blacklist 150 includes the malicious code identifier for the malicious code. Accordingly, the heuristically detected malicious code, which was previously unknown malicious code, becomes known malicious code from which host computer system 102 is protected as discussed further below in reference to FIG. 3. Specifically, instead of being unknown malicious code which requires a heuristic solution for detection, the malicious code is known malicious code which can be readily identified using file based detection, e.g., an antivirus scanner. Further, the file based detection is rapidly achieved.

FIG. 3 is a flow diagram of a malicious code remediation process 300 in accordance with one embodiment. Referring now to FIGS. 1, 2 and 3 together, execution of heuristic detection malicious code blacklist updating and protection application 106 by processor 108 results in the operations of malicious code remediation process 300 as described below in one embodiment.

From an ENTER OPERATION 302, flow moves to a SCAN FOR MALICIOUS CODE USING CREATED MALICIOUS CODE IDENTIFIER OPERATION 304. In SCAN FOR MALICIOUS CODE USING CREATED MALICIOUS CODE IDENTIFIER OPERATION 304, host computer system 102 is scanned for malicious code using the malicious code identifier created in CREATE MALICIOUS CODE IDENTIFIER OPERATION 210.

For example, an antivirus scanner of heuristic detection malicious code blacklist updating and protection application 106, and/or optionally, of security application 152, scans host computer system 102 using virus definitions of blacklist 150. The virus definitions of blacklist 150 include the virus signature created in CREATE MALICIOUS CODE IDENTIFIER OPERATION 210 of the malicious code. This scan can be triggered manually by the user, e.g., human, of host computer system 102, on access of a file or resource of host computer system 102, or by a scheduled scan of host computer system 102.

From SCAN FOR MALICIOUS CODE USING CREATED MALICIOUS CODE IDENTIFIER OPERATION 304, flow moves to a MALICIOUS CODE DETECTED CHECK OPERATION 306. In MALICIOUS CODE DETECTED CHECK OPERATION 306, a determination is made as to whether malicious code has been detected using the created malicious code identifier.

If malicious code is not detected, flow moves from MALICIOUS CODE DETECTED CHECK OPERATION 306 and exits at an EXIT OPERATION 310. In this event, the malicious code is not present on host computer system 102 and does not present a risk to host computer system 102. Accordingly, no further action is taken.

Conversely, if malicious code is detected in MALICIOUS CODE DETECTED CHECK OPERATION 306, flow moves to a REMEDIATE MALICIOUS CODE OPERATION 308. For example, as a result of SCAN FOR MALICIOUS CODE USING CREATED MALICIOUS CODE IDENTIFIER OPERATION 304, a determination is made that a file matches the created virus signature in the virus definitions of blacklist 150. For example, a byte-pattern of the file, e.g., the hash value of the file, matches the byte-pattern of the virus signature, e.g., a hash value, indicating that the file includes malicious code. Accordingly, a determination is made that malicious code is detected in MALICIOUS CODE DETECTED CHECK OPERATION 306, and flow moves to REMEDIATE MALICIOUS CODE OPERATION 308.

In REMEDIATE MALICIOUS CODE OPERATION 308, the malicious code detected in MALICIOUS CODE DETECTED CHECK OPERATION 306 is remediated. Illustratively, the malicious code is terminated, deleted, quarantined, cleaned, and/or otherwise remediated. In light of this disclosure, those of skill in the art will understand that malicious code is remediated using any one of a number of techniques, and the particular technique used is not essential to this embodiment. From REMEDIATE MALICIOUS CODE OPERATION 308, flow moves to and exits at EXIT OPERATION 310.

As set forth above, referring to FIGS. 1 and 2, unknown malicious code is heuristically detected on host computer system 102 in MALICIOUS CODE DETECTED CHECK OPERATION 204. A virus signature for the heuristically detected malicious code is created locally on host computer system 102 in CREATE MALICIOUS CODE IDENTIFIER OPERATION 210. Blacklist 150 on host computer system 102 is updated with the virus signature for the heuristically detected malicious code in UPDATE BLACKLIST WITH MALICIOUS CODE IDENTIFIER OPERATION 212.

Accordingly, blacklist 150 of host computer system 102 is updated with the virus signature of the heuristically detected malicious code without distribution of the virus signature to the general public. In one example, the heuristically detected malicious code is a one-hit wonder, i.e., infects only host computer system 102 and not the general public. By some estimates, 60 percent of malicious code infects only a single host computer system. Nevertheless, host computer system 102 is protected while at the same time unnecessary distribution of the virus signature of the heuristically detected malicious code to the general public is avoided.

Further, referring now to FIGS. 1 and 3 together, host computer system 102 is scanned for other instances of the heuristically detected malicious code using the created virus signature in SCAN FOR MALICIOUS CODE USING CREATED MALICIOUS CODE IDENTIFIER OPERATION 304. If any other instances of the malicious code are detected in MALICIOUS CODE DETECTED CHECK OPERATION 306, the malicious code is remediated in REMEDIATE MALICIOUS CODE OPERATION 308. Accordingly, file based detection and remediation of the malicious code is achieved. More particularly, the malicious code is detected as a file without requiring execution of the malicious code for detection and the associated risks.

To illustrate a specific example, referring now to FIGS. 1, 2 and 3 together, assuming the case where an e-mail including a malicious attachment is propagated from malicious code propagation computer system 104 to host computer system 102. The malicious attachment includes unknown malicious code, i.e., malicious code for which a virus signature does not exist in blacklist 150.

Upon receipt of the e-mail by host computer system 102, the malicious attachment is scanned using the virus definitions of blacklist 150. As blacklist 150 does not yet contain a virus signature for the malicious attachment, the unknown malicious code of the malicious attachment is not detected during this scan.

The user of host computer system 102 executes the malicious attachment, e.g., thinking it is an e-card from a secret admirer. Upon execution, the malicious code of the malicious attachment copies itself into various regions of the file system of host computer system 102, while at the same time launches one or more of the copies. This behavior of the malicious code is heuristically detected in MALICIOUS CODE DETECTED CHECK OPERATION 204.

A determination is made that blacklist 150 does not include a virus signature of the heuristically detected malicious code in BLACKLIST INCLUDES MALICIOUS CODE IDENTIFIER CHECK OPERATION 208. Accordingly, a virus signature of the heuristically detected malicious code is created locally on host computer system 102 in CREATE MALICIOUS CODE IDENTIFIER OPERATION 210. Blacklist 150 is updated with the virus signature of the heuristically detected malicious code in UPDATE BLACKLIST WITH MALICIOUS CODE IDENTIFIER OPERATION 212. Accordingly, blacklist 150 of host computer system 102 is updated with the virus signature of the heuristically detected malicious code without distribution of the virus signature to the general public.

A scan for other instances of the heuristically detected malicious code using the created virus definition is performed in SCAN FOR MALICIOUS CODE USING CREATED MALICIOUS CODE IDENTIFIER OPERATION 304. The various instances of the malicious code copied into various regions of the file system of host computer system 102 are detected in MALICIOUS CODE DETECTED CHECK OPERATION 306 based upon the scan. These instances of the malicious code are remediated in REMEDIATE MALICIOUS CODE OPERATION 308. Accordingly, file based detection and remediation of the malicious code is achieved avoiding execution of the malicious code and the associated risks.

Referring again to FIG. 1, heuristic detection malicious code blacklist updating and protection application 106 is in computer memory 114. As used herein, a computer memory refers to a volatile memory, a non-volatile memory, or a combination of the two.

Although heuristic detection malicious code blacklist updating and protection application 106 is referred to as an application, this is illustrative only. Heuristic detection malicious code blacklist updating and protection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a tangible storage medium configured to store or transport computer readable code in accordance with an embodiment. Some examples of computer program products are CD-ROM discs (CDs), DVDs, ROM cards, floppy discs, magnetic tapes, computer hard drives, and servers on a network.

As illustrated in FIG. 1, this medium may belong to the computer system itself. However, the medium also may be removed from the computer system. For example, heuristic detection malicious code blacklist updating and protection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the heuristic detection malicious code blacklist updating and protection functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the heuristic detection malicious code blacklist updating and protection functionality in accordance with one embodiment can be implemented in a wide variety of computer system configurations. In addition, the heuristic detection malicious code blacklist updating and protection functionality could be stored as different modules in memories of different devices. For example, heuristic detection malicious code blacklist updating and protection application 106 could initially be stored in server system 130, and then as necessary, a portion of heuristic detection malicious code blacklist updating and protection application 106 could be transferred to host computer system 102 and executed on host computer system 102. Consequently, part of the heuristic detection malicious code blacklist updating and protection functionality would be executed on processor 134 of server system 130, and another part would be executed on processor 108 of host computer system 102. In view of this disclosure, those of skill in the art can implement various embodiments in a wide-variety of physical hardware configurations using an operating system and computer programming language of interest to the user.

In yet another embodiment, heuristic detection malicious code blacklist updating and protection application 106 is stored in memory 136 of server system 130. Heuristic detection malicious code blacklist updating and protection application 106 is transferred over network 124 to memory 114 in host computer system 102. In this embodiment, network interface 138 and I/O interface 110 would include analog modems, digital modems, or a network interface card. If modems are used, network 124 includes a communications network, and heuristic detection malicious code blacklist updating and protection application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
providing a virus signature file on a host computing system, the virus signature file being updated regularly from an external central security server;
detecting malicious code on a host computer system;
determining that the virus signature of said host computer system does not include a virus signature of said malicious code;
determining whether a locally stored blacklist of said host computer system comprises a malicious code identifier of said malicious code;
creating said malicious code identifier locally on said host computer system upon a determination that said blacklist does not comprise said malicious code identifier; and
updating said locally stored blacklist with said malicious code identifier;
notifying the central security server of the malicious code identifier, wherein the central security server further stores the notification separately from the virus signature file updates;
wherein the central security server determines whether more than a threshold number of notification counts of said malicious code identifier has been reached, upon which time the central security server distributes a certified virus definition having the virus signature file updates, including the malicious code identifier, to a least a member of public; and
wherein a malicious code blacklist updating and protection application, initially installed in the security server, can be transferred to the host computer system.

2. The computer-implemented method of claim 1 wherein said detecting malicious code comprises heuristically determining that said malicious code is malicious based upon a behavior of said malicious code.

3. The computer-implemented method of claim 1 wherein said detecting malicious code comprises:
scanning a file of said host computer system using virus definitions of said blacklist; and
determining that said file matches a virus signature of said blacklist.

4. The computer-implemented method of claim 3 wherein a determination is made that said blacklist does comprise a malicious code identifier of said malicious code during said determining whether a blacklist of said host computer system comprises a malicious code identifier of said malicious code.

5. The computer-implemented method of claim 4 wherein said malicious code is known malicious code.

6. The computer-implemented method of claim 1 further comprising remediating said malicious code.

7. The computer-implemented method of claim 1 wherein said determining whether a blacklist of said host computer system comprises a malicious code identifier of said malicious code comprises determining whether said malicious code matches a virus signature in said blacklist.

8. The computer-implemented method of claim 7 wherein upon a determination that said malicious code does not match a virus signature in said blacklist, said malicious code is unknown malicious code.

9. The computer-implemented method of claim 1 wherein said creating said malicious code identifier comprises creating a virus signature for said malicious code.

10. The computer-implemented method of claim 1 wherein said creating said malicious code identifier comprises creating a hash value of said malicious code.

11. The computer-implemented method of claim 1 wherein said malicious code identifier uniquely identifies said malicious code.

12. The computer-implemented method of claim 1 further comprising receiving a virus definition update with said host computer system from a security company server, said virus definition update not including said malicious code identifier for said malicious code.

13. The computer-implemented method of claim 12 wherein said virus definition update is distributed to the public.

14. The computer-implemented method of claim 1 further comprising providing a notification of detection of said malicious code to a security company server.

15. The computer-implemented method of claim 14 wherein upon receiving a threshold number of said notifications from host computer systems, a virus definition update including said malicious code identifier of said malicious code is distributed to the public.

16. The computer-implemented method of claim 1 further comprising scanning said host computer system for said malicious code using said malicious code identifier.

17. The computer-implemented method of claim 1 further comprising determining whether said malicious code was detected during said scanning, wherein upon a determination that said malicious code was detected, said method further comprising remediating said malicious code.

18. The computer-implemented method of claim 17 wherein said malicious code is remediated without execution of said malicious code.

19. A computer-program product comprising a nontransitory computer readable storage medium containing computer program code which when executed by a computing processor, performs a process comprising:

providing a virus signature file on a host computing system, the virus signature file being updated regularly from an external central security server;
detecting malicious code on a host computer system;
determining that the virus signature of said host computer system does not include a virus signature of said malicious code;
determining whether a locally stored blacklist of said host computer system comprises a malicious code identifier of said malicious code;
creating said malicious code identifier locally on said host computer system upon a determination that said blacklist does not comprise said malicious code identifier; and
updating said locally stored blacklist with said malicious code identifier;
notifying the central security server of the malicious code identifier, wherein the central security server further stores the notification separately from the virus signature file updates;
wherein the central security server determines whether more than a threshold number of notification counts of said malicious code identifier has been reached, upon which time the central security server distributes a certified virus definition having the virus signature file updates, including the malicious code identifier, to a least a member of public; and
wherein a malicious code blacklist updating and protection application, initially installed in the security server, can be transferred to the host computer system.

* * * * *

UNITED STATES PATENT AND TRADEMARK OFFICE
CERTIFICATE OF CORRECTION

| | | |
|---|---|---|
| PATENT NO. | : 8,225,405 B1 | |
| APPLICATION NO. | : 12/362352 | |
| DATED | : July 17, 2012 | |
| INVENTOR(S) | : Christopher Peterson and Joseph H. Chen | |

It is certified that error appears in the above-identified patent and that said Letters Patent is hereby corrected as shown below:

In Column 11, Lines 59-60, Claim 1, replace "a least a member of public" with --at least a member of the public--; and In Column 14, Lines 10-11, Claim 19, replace "a least a member of public" with --at least a member of the public--.

Signed and Sealed this
Eleventh Day of September, 2012

David J. Kappos
*Director of the United States Patent and Trademark Office*